US009215346B2

(12) United States Patent
Uchidate et al.

(10) Patent No.: US 9,215,346 B2
(45) Date of Patent: Dec. 15, 2015

(54) IMAGE FORMING APPARATUS

(71) Applicant: CANON KABUSHIKI KAISHA, Tokyo (JP)

(72) Inventors: Hikaru Uchidate, Yokohama (JP); Yuji Takayama, Yokohama (JP); Tomoyuki Saiki, Suntou-gun (JP); Go Araki, Suntou-gun (JP); Kazuo Ogata, Tokyo (JP); Hiroko Katsuyama, Matsubara (JP); Ichiro Yasumaru, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/888,494

(22) Filed: May 7, 2013

(65) Prior Publication Data
US 2013/0308166 A1 Nov. 21, 2013

(30) Foreign Application Priority Data
May 7, 2012 (JP) ................................ 2012-106111

(51) Int. Cl.
| G09C 3/00 | (2006.01) |
| G06F 15/00 | (2006.01) |
| H04N 1/40 | (2006.01) |
| H04N 1/44 | (2006.01) |
| H04N 1/00 | (2006.01) |

(52) U.S. Cl.
CPC ....... *H04N 1/40093* (2013.01); *H04N 1/00864* (2013.01)

(58) Field of Classification Search
None
See application file for complete search history.

(56) References Cited

U.S. PATENT DOCUMENTS

| 8,208,172 | B2 | 6/2012 | Takayama et al. |
| 2003/0085940 | A1* | 5/2003 | Yamada .......................... 347/19 |
| 2003/0206633 | A1* | 11/2003 | Uchino .......................... 380/246 |
| 2005/0190948 | A1* | 9/2005 | Isogai ........................... 382/100 |
| 2007/0076261 | A1* | 4/2007 | Ito .................................. 358/3.28 |
| 2007/0176000 | A1* | 8/2007 | Cattrone et al. .......... 235/462.01 |
| 2007/0211304 | A1* | 9/2007 | Niitsuma ...................... 358/448 |
| 2008/0062477 | A1* | 3/2008 | Jo .................................. 358/498 |
| 2009/0037980 | A1 | 2/2009 | Kubo |
| 2009/0168093 | A1* | 7/2009 | Kim ............................. 358/1.15 |
| 2009/0175495 | A1* | 7/2009 | Kamei et al. ................. 382/100 |

(Continued)

FOREIGN PATENT DOCUMENTS

| JP | 2006-126488 A | 5/2006 |
| JP | 2006-232467 A | 9/2006 |

(Continued)

OTHER PUBLICATIONS

English Translation of JP 2007166010 A: Image Processing Apparatus, Original-Discarding Method, Program and Information Recording Medium, Toru Suino, Jun. 28, 2007.*

(Continued)

*Primary Examiner* — Marivelisse Santiago Cordero
*Assistant Examiner* — Moustapha Diaby
(74) *Attorney, Agent, or Firm* — Fitzpatrick, Cella, Harper & Scinto

(57) ABSTRACT

The image forming apparatus reads an original conveyed in the image forming apparatus, analyzes a feature value of information about an original image on the read original, generates an image to overwrite the original image with, using image data having the feature value obtained based on an analysis result, sets a predetermined area on the original image, and overwrites the predetermined area on the original image with the generated image.

19 Claims, 13 Drawing Sheets

(56) References Cited

U.S. PATENT DOCUMENTS

| | | | |
|---|---|---|---|
| 2009/0245512 A1* | 10/2009 | Masui et al. | 380/54 |
| 2009/0257586 A1* | 10/2009 | Takahashi et al. | 380/55 |
| 2010/0008585 A1* | 1/2010 | Saito | 382/190 |
| 2010/0042828 A1* | 2/2010 | Masui et al. | 713/153 |
| 2010/0230493 A1* | 9/2010 | Akiyama | 235/437 |
| 2010/0328388 A1* | 12/2010 | Takekoshi et al. | 347/14 |
| 2011/0194154 A1* | 8/2011 | Oi | 358/448 |
| 2011/0233852 A1* | 9/2011 | Ikarashi | 271/207 |
| 2011/0299861 A1 | 12/2011 | Ogawa et al. | |
| 2012/0019872 A1* | 1/2012 | Kanno | 358/3.28 |
| 2012/0075671 A1* | 3/2012 | Ogawa et al. | 358/1.15 |

FOREIGN PATENT DOCUMENTS

| | | | |
|---|---|---|---|
| JP | 2007-166010 A | | 6/2007 |
| JP | 2007166010 A | * | 6/2007 |
| JP | 2010-197550 A | | 9/2010 |
| JP | 2011-062819 A | | 3/2011 |
| JP | 2012-134706 A | | 7/2012 |

OTHER PUBLICATIONS

U.S. Appl. No. 13/871,512, filed Apr. 26, 2013 to Uchidate.

U.S. Appl. No. 13/888,503, filed May 7, 2013 to Takayama et al.

* cited by examiner

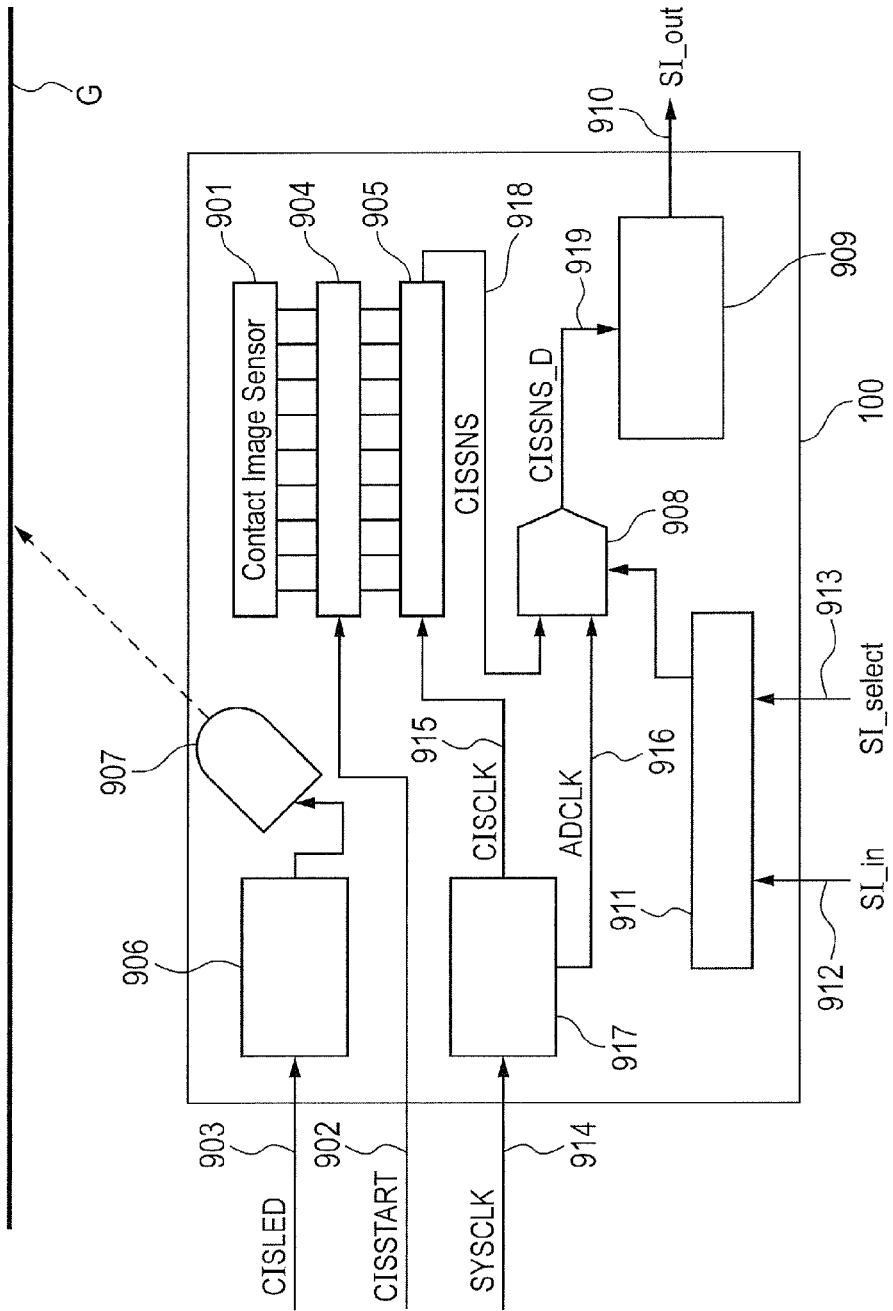

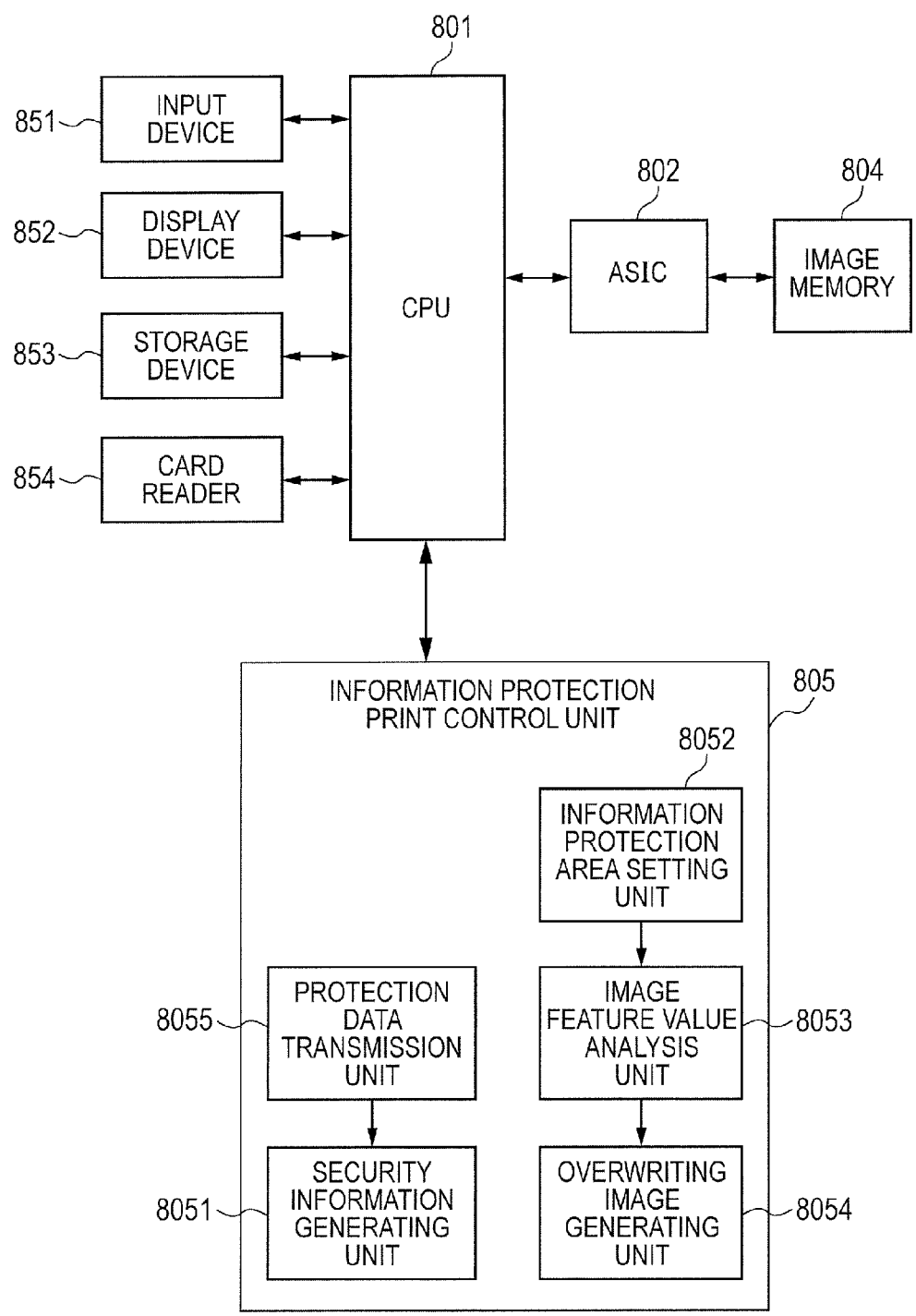

FIG. 8A

ABCDE ¥300,000

FIG. 8B

ABCDE ¥300,000

~1401
\* \*, 2012
| Estimation No. | Responsible person |
|---|---|
| 03-100 | AA  AA |
To: ○○○○  Inc.
○○×x-x-x
○○Pref., ○○City,
ESTIMATE
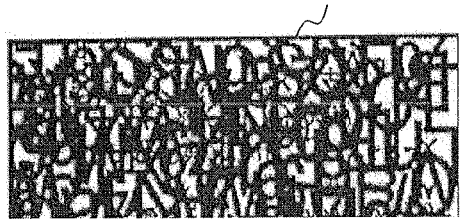
1402
Please find the cost estimation as follows. You are kindly requested to consider it.
Expiring Date  \* \*, 2012
| Product Number, Product Name | Pcs. | Price | Total | Remarks |
|---|---|---|---|---|
| △△△ | | | | |
| ◆◆◆◆ | | | | |
| ○○○ | | | | ~ 1403 |
| ☆☆☆☆ | | | | |
| □□□□ | | | | |
1403
FIG.9B

IMAGE FORMING APPARATUS

BACKGROUND OF THE INVENTION

1. Field of the Invention

The present invention relates to an image forming apparatus such as a copier or laser beam printer equipped with an original scanning apparatus typified by an automatic document feeder unit (ADF) or with an ADF.

2. Description of the Related Art

Conventionally, in an image forming apparatus of this type, an original conveyance path leading to an original conveyance type of an original scanning unit and a recording material conveyance path of an image forming unit for a recording material are configured independently of each other. That is, with respect to each of the original and the recording material, a sheet feeding unit, a guide member making up a predetermined conveyance route, plural conveyance rollers, a motor configured to drive the conveyance rollers, and a sheet discharge unit are disposed independently of one another. This inevitably complicates an overall mechanism of the image forming apparatus and increases the cost and apparatus size. Thus, for example, Japanese Patent Application Laid-Open No. 2006-232467 proposes to simplify a conveyance mechanism and achieve cost and size reductions by combining an original conveyance path and a recording material conveyance path into a common path by disposing an original scanning unit in a double-side conveyance route of a recording material.

Furthermore, when the original conveyance path and recording material conveyance path are combined into a common path, an original can be used as recording material after an image is read, enabling overwrite printing on the original. Using this overwrite printing function, for example, Japanese Patent Application Laid-Open No. 2006-126488 and No. 2010-197550 disclose techniques for filling a printed image on an original for the purpose of information protection. Japanese Patent Application Laid-Open No. 2006-126488 discloses a technique for performing a filling process by selecting an image pattern or solid image as an overwriting image based on information about a mark printed on a read original; and doing overwrite printing regularly on an entire surface of the original using the selected overwriting image. Also, Japanese Patent Application Laid-Open No. 2010-197550 discloses a technique for performing a filling process by detecting edges of inscribed information in an arbitrary fill area on a read original; and filling an outer area bordered by the edges with a solid image.

However, with the technique disclosed in Japanese Patent Application Laid-Open No. 2006-126488 since overwrite printing is done on the entire surface of the original using an image pattern or solid image, even that part of the original which does not need information protection is subjected to overwrite printing. Furthermore, since the overwrite printing is done with a regular image pattern, the inscribed information is legible in some cases, failing to ensure sufficient security.

Also, with the technique disclosed in Japanese Patent Application Laid-Open No. 2010-197550 since an arbitrary area on the original is filled with a solid image except for the inscribed information, toner is consumed more than necessary, which is not desirable for the user from the viewpoint of source and cost savings.

SUMMARY OF THE INVENTION

The present invention has been made in view of the above circumstances and has an object to provide an image forming apparatus which can reduce toner consumption and protect information by overwrite printing.

Another purpose of the present invention is to provide an image forming apparatus including a scanning unit configured to read an original conveyed in the image forming apparatus, an analysis unit configured to analyze a feature value of information about an original image on the original read by the scanning unit, an image generating unit configured to generate an image to overwrite the original image with, using image data having the feature value obtained based on an analysis result produced by the analysis unit, an area setting unit configured to set an area on the original image; and an image forming unit configured to overwrite the image generated by the image generating unit in the area set by the area setting unit, on the original image.

Further features of the present invention will become apparent from the following description of exemplary embodiments with reference to the attached drawings.

BRIEF DESCRIPTION OF THE DRAWINGS

FIG. 4 is a block diagram illustrating a circuit configuration of an original scanning unit according to the first to third embodiments.

FIG. 6 is a functional block diagram illustrating a configuration of an information protection print control unit 805 according to the first to third embodiments.

FIGS. 8A, 8B, 8C, 8D and 8E are diagrams describing image data generation for information protection printing according to the first to third embodiments.

FIGS. 9A and 9B are diagrams illustrating an embodiment of information protection printing according to the second embodiment.

DESCRIPTION OF THE EMBODIMENTS

Preferred embodiments of the present invention will now be described in detail in accordance with the accompanying drawings.

(First Embodiment)

(Image Forming Process of Image Forming Apparatus)

Figure 1A:
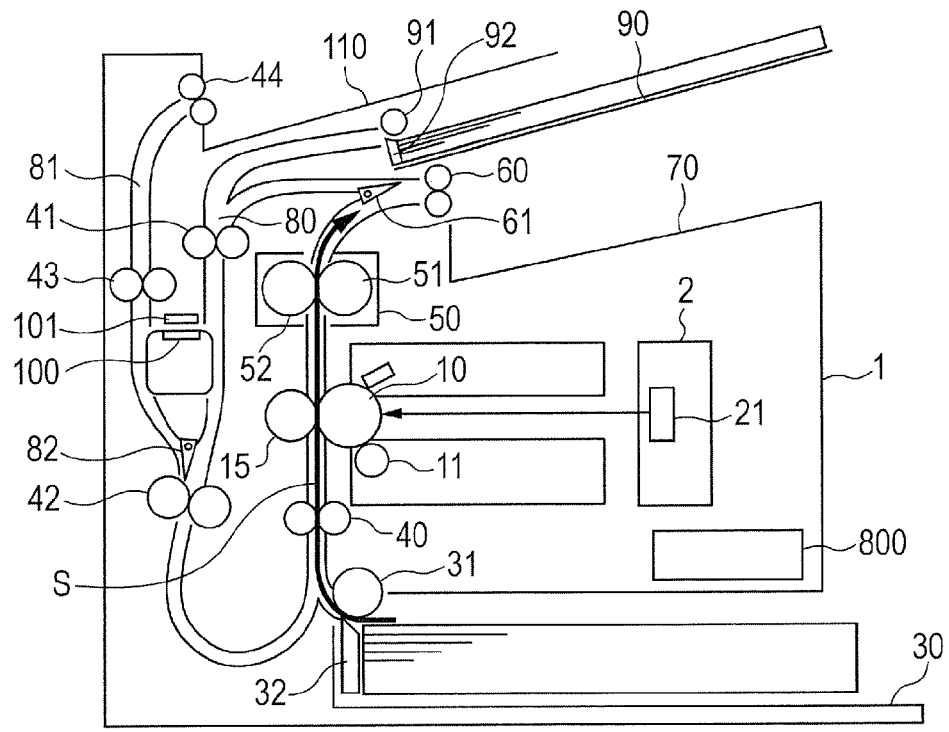
FIG. 1A is a sectional view illustrating a configuration of an image forming apparatus according to a first embodiment.

First, an image forming process will be described. FIG. 1A is a sectional view of an image forming apparatus according to the present embodiment. In FIG. 1A, a photosensitive drum 10 and a developing roller 11 are placed in the center of the image forming apparatus 1, where the photosensitive drum 10 serves as an image bearing member by being configured to be rotatable and the developing roller 11 rotates in parallel contact with the photosensitive drum 10 while holding toner. Upon receiving an image formation command, a light-emitting unit 21 of an optical unit 2 irradiates a surface of the rotating photosensitive drum 10 with a laser beam. A latent image of electric charge is formed on the surface of the photosensitive drum 10 irradiated with the laser beam. As toner held by the developing roller 11 is caused to adhere to the latent image on the surface of the photosensitive drum 10, developing the latent image, a toner image is formed on the surface of the photosensitive drum 10.

A first sheet feeding unit 30 contains recording material S which is conveyed along a conveyance path for image formation and on which an image is formed, where the conveyance path for image formation is a first conveyance path constructed between a conveyance roller 40 and paper discharge roller 60. When an image formation command is issued, the recording material S is conveyed sheet by sheet to the conveyance roller 40 by a cassette (hereinafter referred to as "CST") pick-up roller 31 and separating member 32. The conveyance roller 40 conveys the recording material S to a transfer roller 15 by adjusting conveyance timing such that the toner image on the photosensitive drum 10 will be transferred to a predetermined position on the recording material S.

The toner image on the photosensitive drum 10 is transferred to the recording material S under transfer bias and pressure applied to the transfer roller 15 and the recording material S is conveyed to a fixing unit 50. The fixing unit 50 fixes the toner image on the recording material S using heat of a heat roller 51 and pressure of a pressure roller 52 placed opposite the heat roller 51. The recording material S with the toner image fixed thereon is conveyed to the paper discharge roller 60.

Figure 1B:
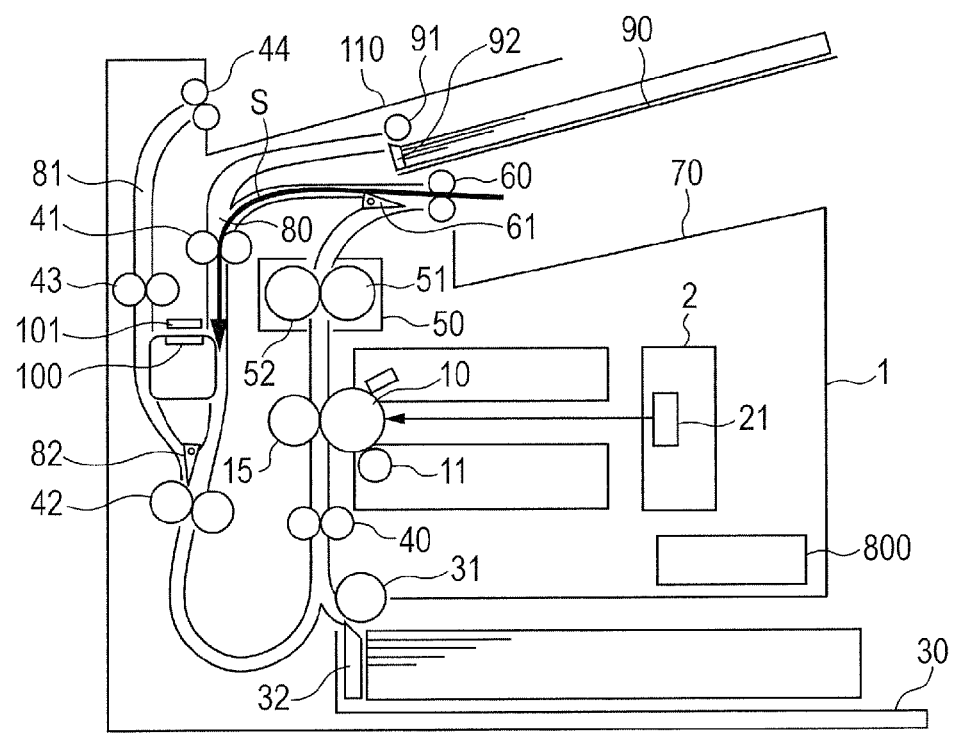
FIG. 1B is a sectional view illustrating the configuration of the image forming apparatus according to the first embodiment, and at the same time is an explanatory diagram of a double-side printing process, in particular.

In the case of one-side printing, the paper discharge roller 60 conveys the recording material S directly to outside the apparatus, loading the recording material S onto a first sheet discharge unit 70. In the case of double-side printing, the paper discharge roller 60 transfers the recording material S until a rear end of the recording material S in a conveyance direction passes a double-side flapper 61. When it is detected that the recording material S has passed the double-side flapper 61, the double-side flapper 61 switches a destination of the recording material S to the side of a common conveyance path 80, which is a second conveyance path along which both recording material S and original G are conveyed. Then, the paper discharge roller 60 rotates in a reverse direction and conveys the recording material S to the common conveyance path 80. As illustrated in FIG. 1B, after being reversed, the recording material S is conveyed to an original scanning unit 100 by a conveyance roller 41. Furthermore, the recording material S is conveyed to the transfer roller 15 again by a conveyance roller 42 and the conveyance roller 40, a toner image is transferred to the other side of the recording material S and fixed onto the recording material S by the fixing unit 50, and then the recording material S is loaded onto the first sheet discharge unit 70 by the paper discharge roller 60.

(Double-Side Reading Operation with Respect to Original and Double-Side Printing Operation with Respect to Recording Material)

Figure 2A:
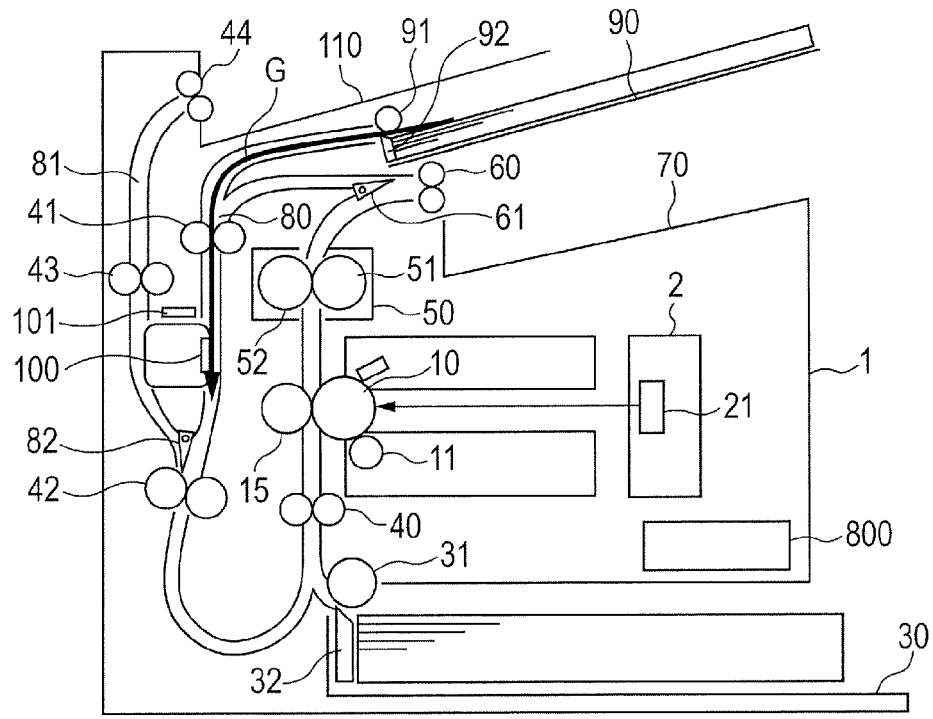
FIGS. 2A, 2B, 2C, 2D and 2E are diagrams describing double-side reading operation with respect to an original and double-side printing operation with respect to recording material according to the first embodiment.

Next, the processes of reading an image on an original and performing double-side printing on recording material will be described. FIG. 2A is an explanatory diagram illustrating an inside condition of the apparatus when a top surface of the original G starts to be read. The original G contained in a second sheet feeding unit 90 installed in an upstream portion of the common conveyance path 80 in the conveyance direction is conveyed sheet by sheet to the conveyance roller 41 by an original pick-up roller 91 and separating member 92. Before starting to read the first side which is a front face of the original G conveyed from the second sheet feeding unit 90, the original scanning unit 100 emits light to a white reference member 101, make corrections to a white reference value, and then rotates to a position facing the common conveyance path 80. The conveyance roller 41 conveys the original G to the original scanning unit 100. The original scanning unit 100, which is already located at a position facing the common conveyance path 80, detects a leading edge of the original G in the conveyance direction and reads an image of the original G. The image read by the original scanning unit 100 is stored as original image data of the first side of the original in an image memory 804 described later.

Figure 2B:
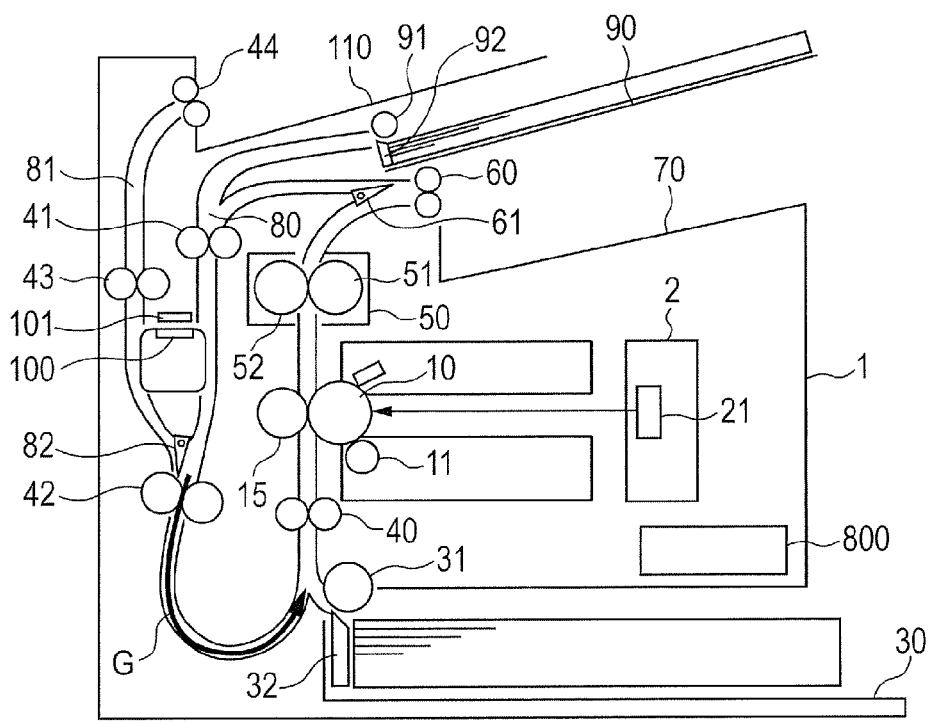

FIG. 2B is an explanatory diagram illustrating an inside condition of the apparatus when reading of the first side as the top surface of the original G is finished. After passing the original scanning unit 100, the original G is conveyed to the conveyance roller 42. The conveyance roller 42 stops the moment a rear end of the original G passes a switchback flapper (reversal flapper) 82, and the original G stops by being nipped by the conveyance roller 42.

Figure 2C:
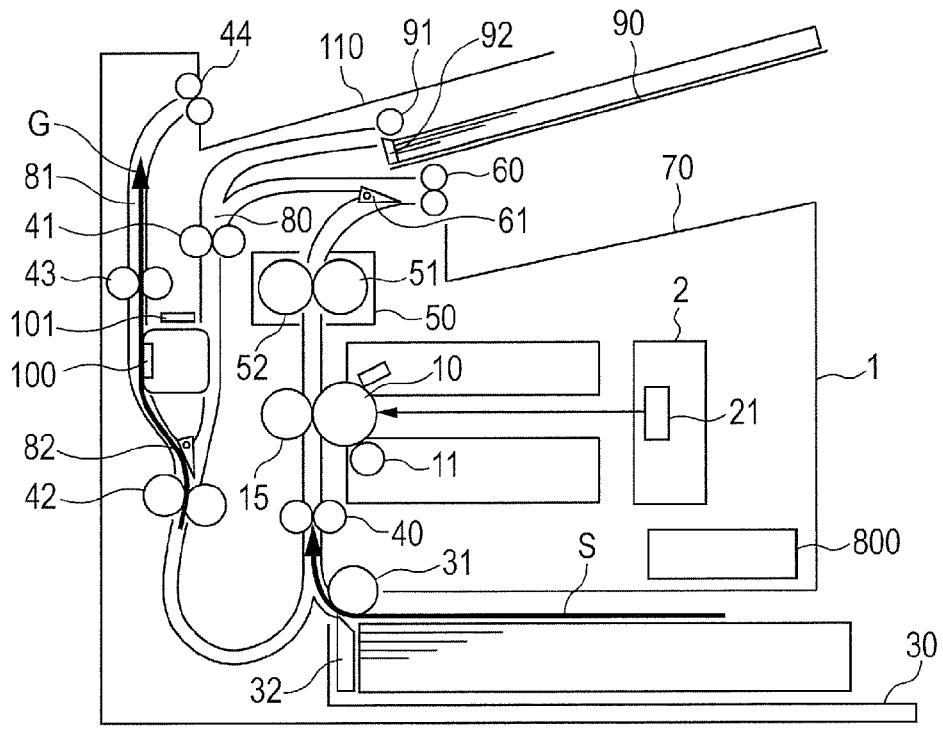

FIG. 2C is an explanatory diagram illustrating an inside condition of the apparatus when reading of the second side as a rear surface of the original G is started. When the reversal flapper 82 switches the conveyance path of the original G from the side of the common conveyance path 80 to the side of a dedicated original conveyance path 81 which is a third conveyance path, the original scanning unit 100 rotates to a position facing the dedicated original conveyance path 81. The conveyance roller 42 rotates in the reverse direction and the original G is conveyed to the original scanning unit 100 along the dedicated original conveyance path 81. Upon detecting the leading edge of the original G in the conveyance direction, the original scanning unit 100 reads the image on the second side which is the rear face of the original G and stores the image as original image data of the second side of the original in the image memory 804. When the rear face of the original G is not read, the original G is conveyed along the dedicated original conveyance path 81 by conveyance rollers 43 and 44 and loaded onto a second sheet discharge unit 110.

The recording material S fed from the first sheet feeding unit 30 is conveyed sheet by sheet to the conveyance roller 40. Almost simultaneously, first a laser beam from the light-emitting unit 21 is directed at the photosensitive drum 10, forming a latent image on the photosensitive drum 10 based on the original image data of the second side which is the rear face of the original G, where the original image data is stored in the image memory 804. Next, a toner image formed by developing the latent image is transferred by the transfer roller 15 onto the recording material S, which is then conveyed to a fixing unit 50, thereby completing image formation based on the second side of the original G. Incidentally, although in FIG. 2C, the recording material S starts to be fed when the second side which is the rear face of the original G starts to be read, the recording material S may start to be fed after the reading of the image on the second side of the original G is finished.

Figure 2D:
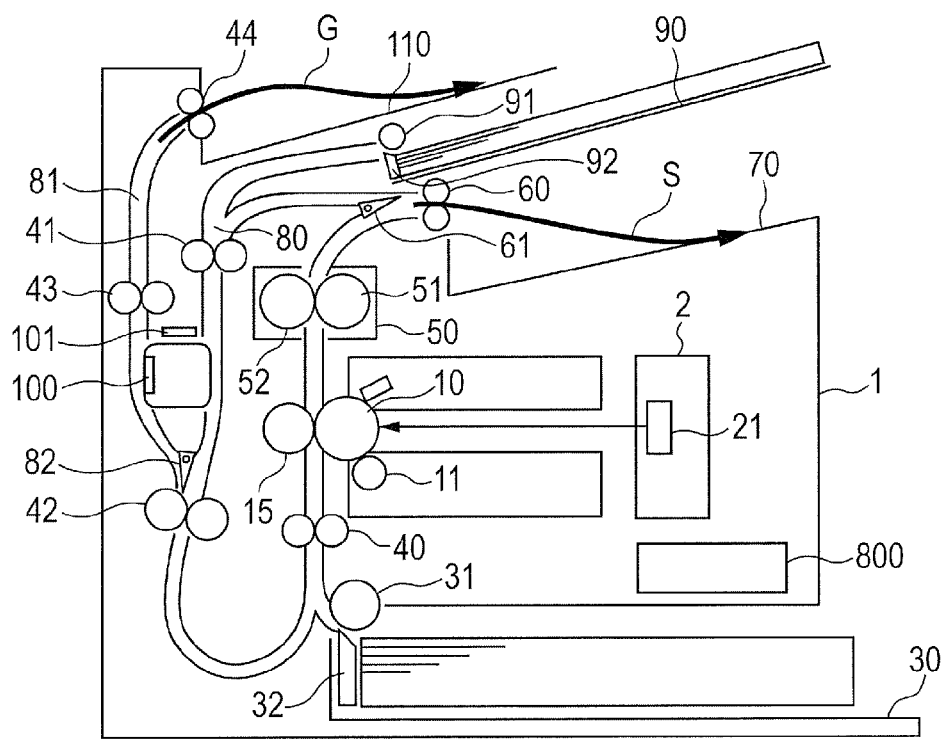

FIG. 2D is an explanatory diagram illustrating an inside condition of the apparatus when read of the rear surface of the original G is finished. When the reading of the original G is finished, the original G is conveyed by the conveyance rollers 43 and 44 and loaded onto the second sheet discharge unit 110. When the rear end of the original G passes, the reversal flapper 82 switches the conveyance path of the original G from the dedicated original conveyance path 81 to the common conveyance path such that the recording material S conveyed along the common conveyance path 80 will be conveyed toward the conveyance roller 40. After completion of the image formation based on the second side of the original G, with the conveyance path switched to the common conveyance path 80 by the double-side flapper 61, the recording material S is conveyed to the common conveyance path 80 by reverse rotation of the paper discharge roller 60 installed in a downstream portion the conveyance path of the recording material S in the conveyance direction.

Figure 2E:
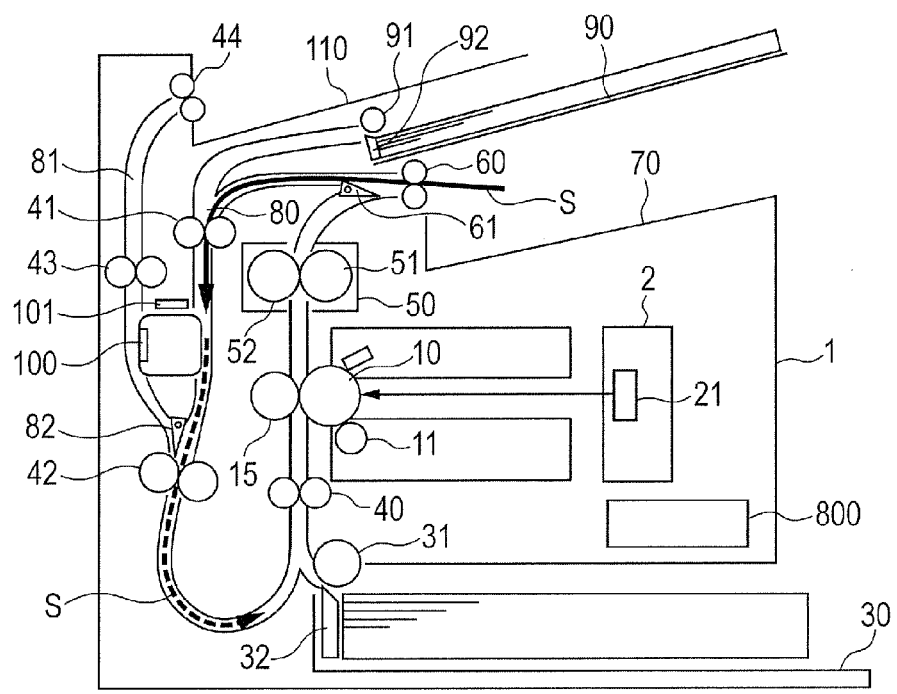

FIG. 2E is an explanatory diagram illustrating how the recording material S is conveyed to an image forming unit to undergo image formation based on the first side of the original G. After being conveyed to the common conveyance path 80, the recording material S passes the original scanning unit 100 whose sensor unit faces the dedicated original conveyance path 81. Then the recording material S is conveyed to the conveyance roller 40 by the conveyance roller 42, and then conveyed again to the transfer roller 15 as with the recording material S indicated by a broken line. Having already been subjected to image formation based on the second side of the original G, the recording material S is subjected to image formation of a toner image based on the original image data of the first side of the original G stored in the image memory 804 and loaded onto the first sheet discharge unit 70.

(Overview of Control Unit of Image Forming Apparatus)

Figure 3:
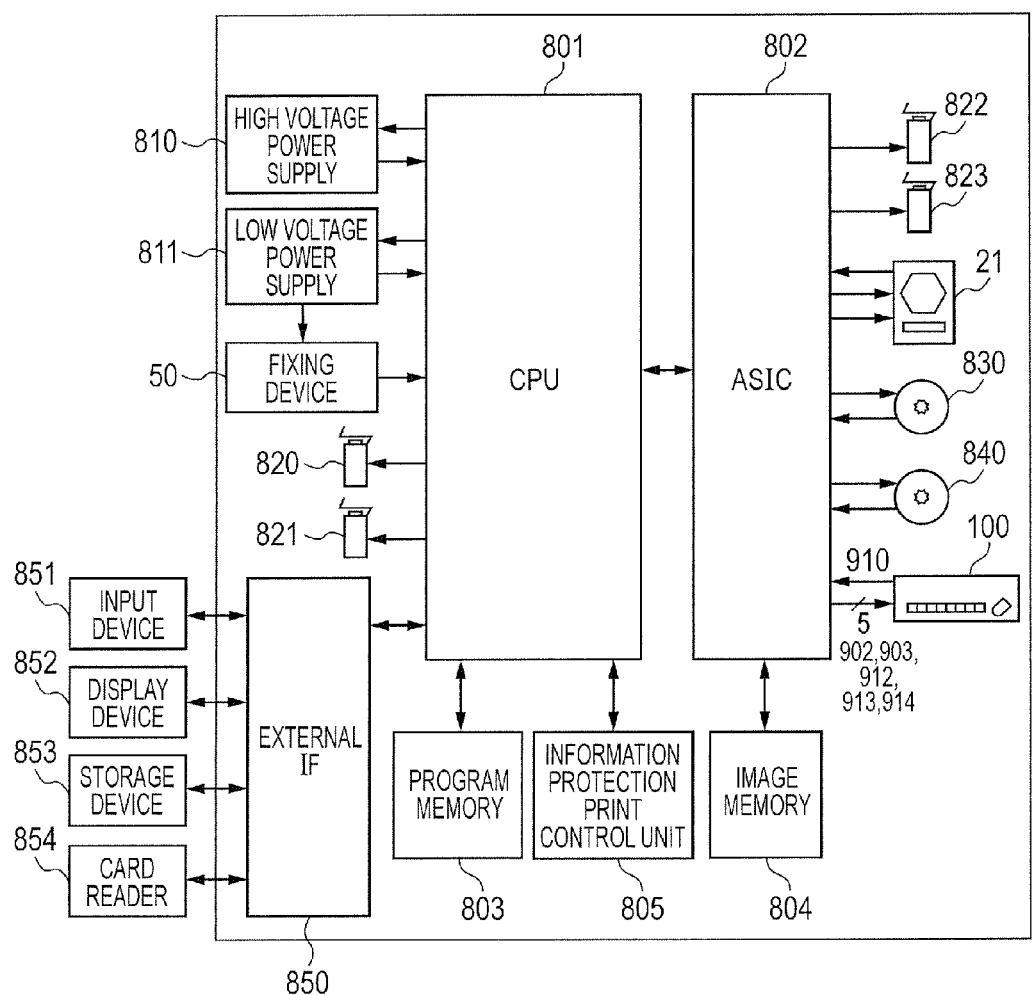
FIG. 3 is a block diagram illustrating a configuration of a control unit according to first to third embodiments.

FIG. 3 is a block diagram illustrating a configuration of a control unit 800 equipped with a CPU 801 configured to control the image forming apparatus 1. In FIG. 3, the light-emitting unit 21 is provided with a rotating polygonal mirror, motor, laser-emitting element, and the like and connected to an ASIC (Application Specific Integrated Circuit) 802. To draw a desired latent image by scanning the photosensitive drum 10 with a laser beam, the CPU 801 outputs a control signal to the ASIC 802 and controls the light-emitting unit 21 of the optical unit 2. The optical unit 2 forms a latent image on the photosensitive drum 10 by turning on and off a laser scanning signal based on print data from the ASIC 802. To convey the recording material S, a main motor 830 drives the CST pick-up roller 31, the conveyance roller 40, the photosensitive drum 10, the transfer roller 15, the heat roller 51, and the pressure roller 52. Also, being activated when a paper feed roller configured to feed the recording material S starts driving, a double-side drive motor 840 drives a CST paper feed solenoid 822, an original pick-up roller 91, and the conveyance rollers 41 to 44, where the CST paper feed solenoid 822 is configured to drive the CST pick-up roller 31. The CPU 801 controls a drive system including the main motor 830 and double-side drive motor 840 via the ASIC 802.

The CPU 801 controls a high-voltage power supply device 810, a low-voltage power supply device 811, and the fixing unit 50, which in turn control a charging bias, a developing bias, and a transfer bias needed for an electrophotographic process. Furthermore, the CPU 801 performs control to detect temperatures using a thermistor (not shown) installed in the fixing unit 50 and keep the temperature of the fixing unit 50 constant.

Also, a program memory 803 is connected to the CPU 801 via a bus (not shown). The program memory 803 stores programs and data used by the CPU 801 to perform processing, and the CPU 801 controls operation of the image forming apparatus 1 based on the programs and data stored in the program memory 803.

The CPU 801 is connected to an input device 851, a display device 852, a storage device 853, and a card reader 854 via an external IF (interface) 850. The input device 851 is, for example, a keyboard attached to a host computer or the image forming apparatus 1. The display device 852 is an LCD display or other similar device which displays information on instructions from the CPU 801. The storage device 853 is installed inside or outside the image forming apparatus 1, and the CPU 801 can print data saved in the storage device 853, during predetermined operation. Also, card reader 854 reads a security card for authentication, and the CPU 801 can inhibit printing operation if information read by the card reader 854 is inappropriate. Upon receiving an operation command from a user via the input device 851, the CPU 801 transmits predetermined operation commands to various devices connected to the CPU 801. The information protection print control unit 805 configured to control information protection printing will be described later.

On instructions from the CPU 801, the ASIC 802 performs speed control for the motor in the light-emitting unit 21 as well as speed control for the main motor 830 and double-side drive motor 840. The ASIC 802 performs speed control for the motors: detects a tack signal (pulse signal which is output from the motor at each rotation of the motor) which is output from each motor and outputs an acceleration or deceleration signal such that the tack signal will be output at predetermined time intervals. In this way, if the motor and the like are controlled by a hardware circuit such as the ASIC 802, control loads of the CPU 801 can be reduced.

Next, control operation performed by the control unit 800 during printing of recording material will be described. Upon receiving a print command via the input device 851, directing the CPU 801 to print recording material, the CPU 801 drives the main motor 830, double-side drive motor 840 and CST paper feed solenoid 822 via the ASIC 802 to convey the recording material S. After the toner image formed on photosensitive drum 10 by the transfer roller 15 is transferred to the recording material S and is fixed on the recording material by the fixing unit 50, the recording material S is discharged by the paper discharge roller 60 onto the first sheet discharge unit 70 serving as a catch tray for the recording material. To improve alignment of recording material, the first sheet discharge unit 70 is sloped gently upward from a paper discharge port in a discharge direction of the recording material. The CPU 801 supplies predetermined electric power from the low-voltage power supply device 811 to the fixing unit 50, causing the fixing unit 50 to generate a desired amount of heat in order to heat the recording material S and thereby fuse and fix the toner image on the recording material S.

Next, control operation performed by the control unit 800 during reading of an original will be described. Upon receiving a read command via the input device 851, directing the CPU 801 to read the original G, the CPU 801 drives a double-side flapper solenoid 820 and the double-side drive motor 840 via the ASIC 802 to operate an original feed solenoid 823. Consequently, torque of the double-side drive motor 840 is transmitted to the original pick-up roller 91 to convey the original G. Also, the original scanning unit 100 reads the original G based on a control signal from the ASIC 802. Through control via the ASIC 802, the CPU 801 saves the original image data read by the original scanning unit 100 in the image memory 804 connected to the ASIC 802. Subsequently, by operating a reversal solenoid 821, the CPU 801 flips the reversal flapper 82 to the side of the dedicated original conveyance path 81 to reverse the double-side drive motor 840 and thereby convey the original G to the second sheet discharge unit 110.

(Overview of Original Scanning Unit)

Next, details of the original scanning unit 100 will be described with reference to FIG. 4. FIG. 4 is a circuit block diagram of the original scanning unit 100. In FIG. 4, a CIS (Contact Image Sensor) sensor unit 901 is a contact image sensor in which, for example, photodiodes of 10368 pixels are arranged in an array at a specific main reading density (e.g., 1200 dpi). A CISSTART signal 902 is an original reading start pulse signal which is input in the CIS sensor and a CISLED signal 903 is a control signal for controlling a light-emitting element 907. A current amplification unit 906 controls current supplied to the light-emitting element 907 based on the CISLED signal 903, and the light-emitting element 907 uniformly irradiates the original G. A timing generator 917 accepts a SYSCLK signal 914 as input and generates a ADCLK signal 916 and CISCLK signal 915. The a SYSCLK signal 914 is a system clock configured to determine operating speed of the original scanning unit 100 and the ADCLK signal 916 is a sampling clock configured to determine a sampling rate of an A/D converter 908. The CISCLK signal 915 is used as a transfer clock for a CISSNS signal 918, which is an output signal of a shift register 905.

Next, original scanning operation will be described. When the CISSTART signal 902 goes active, the CIS sensor unit 901 starts accumulating charges produced by light received after being emitted from the light-emitting element 907 and reflected by the original G and sequentially sets accumulated charge data in an output buffer 904. The timing generator 917 outputs the CISCLK signal 915, for example, at a clock frequency of about 500 kHz to 1 MHz to the shift register 905. The shift register 905 outputs the charge data set in the output buffer 904 to the A/D converter 908 as the CISSNS signal 918 in synchronization with the CISCLK signal 915 accepted as input. The CISSNS signal 918 has a predetermined data guarantee area, making it necessary for the A/D converter 908 to sample the CISSNS signal 918 after a lapse of a predetermined time from a rising time point of the CISCLK signal 915 which is a transfer clock. Also, the CISSNS signal 918 is output from the shift register 905 in synchronization with both rising edge and falling edge of the CISCLK signal 915 which is a transfer clock. Therefore, the ADCLK signal 916, which is a clock used to sample the CISSNS signal 918, is generated by the timing generator 917 such that the frequency of the ADCLK signal 916 will be twice the frequency of the CISCLK signal 915. The CISSNS signal 918 is sampled on a rising edge of the ADCLK signal 916. The timing generator 917 divides the frequency of the SYSCLK signal 914 which is an input system clock and thereby generates the ADCLK signal 916 and the CISCLK signal 915 which is a transfer clock. The phase of the ADCLK signal 916 lags behind the phase of the CISCLK signal 915, which is a transfer clock, by the data guarantee area described above.

The CISSNS signal 918 is converted to digital by the A/D converter 908 and is output as a CISSNS_D signal 919 to an output interface circuit 909. The output interface circuit 909 outputs the CISSNS_D signal 919 as serial data Sl_out 910 with predetermined timing. In so doing, a predetermined number of pixels of the CISSNS_D signal 919 counting from the CISSTART signal 902 which is a start pulse, are used as an analog output reference voltage and cannot be used as effective pixels.

Also, based on an Sl_in signal 912 and Sl_select signal 913 from the CPU 801, a control circuit 911 controls A/D conversion gain of the A/D converter 908 via the ASIC 802. For example, when image contrast of which an original is read is poor, if the A/D conversion gain of the A/D converter 908 is increased, thereby increasing the contrast, the CPU 801 can read the original always with the best contrast.

Although in the equipment configuration described herein, image information on all the pixels are output as the CISSNS_D signal 919, which is a single output signal, in order to read the original at high speed, plural areas may be subjected to A/D conversion by dividing the pixels into areas. Also, although a CIS sensor is used in the original scanning unit 100 in the embodiment described above, the CIS sensor may be replaced with a CMOS sensor or CCD sensor.

(Overwrite Printing Process)

(1) One-Side Overwrite Printing

Figure 5A:
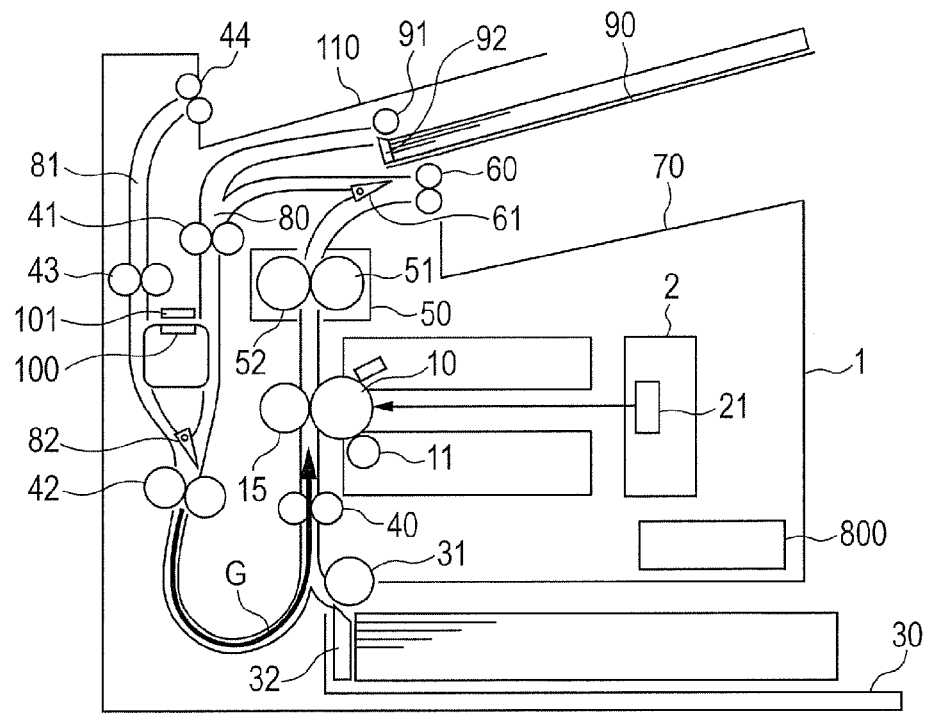
FIGS. 5A and 5B are diagrams describing overwrite printing operation according to the first to third embodiments.

The process of performing overwrite printing will be described. FIG. 5A is an explanatory diagram of one-side overwrite printing. As described in FIGS. 2A and 2B, after the first side of the original G contained in the second sheet feeding unit 90 is read by the original scanning unit 100, the original G stops by being nipped by the conveyance roller 42. After undergoing the image reading, the original G is conveyed to the conveyance roller 40, which then conveys the original G to the transfer roller 15 by adjusting timing such that the toner image on the photosensitive drum 10 will be transferred to a predetermined position on the original G. Consequently, the original G can be used as recording material S and overwrite printing can be gone on the first side of the original G using the same technique as described in FIG. 1A. After the printing is finished, the original G is conveyed to the paper discharge roller 60 and loaded onto the first sheet discharge unit 70.

(2) Double-Side Overwrite Printing

Next, the process of performing double-side overwrite printing will be described. To begin with, description will be given of procedures for the process of performing double-side overwrite printing, which involve reading the first side of the original G and then the second side, and subsequently performing overwrite printing on the first side of the original G and then on the second side.

Figure 5B:
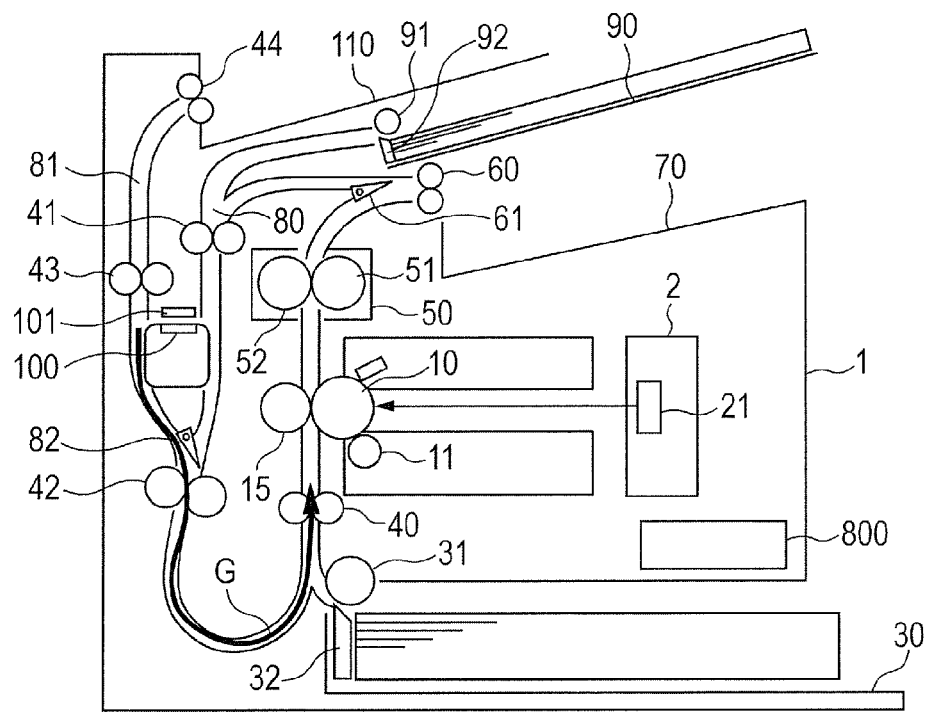

FIG. 5B is an explanatory diagram of double-side overwrite printing. As described with reference to FIGS. 2A, 2B and 2C, first, after the first and second sides of the original G contained in the second sheet feeding unit 90 are read by the original scanning unit 100, the original G stops by being nipped by the conveyance roller 43 on the dedicated original conveyance path 81. Subsequently, the original G is conveyed to the conveyance roller 40, which then conveys the original G to the transfer roller 15 by adjusting timing such that the toner image on the photosensitive drum 10 will be transferred to a predetermined position on the original G. When being conveyed from the dedicated original conveyance path 81 to the conveyance roller 40, the original G passes the original scanning unit 100 again. The original scanning unit 100 reads the original G during the passage of the original G and thereby reads the leading edge of the original in the conveyance direction as well as left and right edges of the original (hereinafter also referred to as the "original's edges"), and overwrite printing is done in alignment with the original's edges. Consequently, since the original's edges are detected when the original enters the image forming unit, misalignment of the original caused by the switchback (reversal) operation after the reading of the original can be corrected accurately. This allows the original G to be used as recording material, enabling overwrite printing on the first side of the original G using the same technique as in FIG. 1A. Besides, using a similar technique described with reference to FIG. 1B, overwrite printing can be done on the second side of the original G as well. After the overwrite printing on the first side is finished, the original G passes the original scanning unit 100 again for overwrite printing operation on the second side as shown in FIG. 1B. The original scanning unit 100 detects the original's edges during the passage of the original G and an image is formed on the second side in alignment with the original's edges. Consequently, misalignment of the original caused by the reversal operation of the paper discharge roller 60 after the image formation on the first side can be corrected, allowing overwrite printing to be done on a desired printing position. When the overwrite printing on the second side is finished, the original G is conveyed to the paper discharge roller 60 and loaded onto the first sheet discharge unit 70.

Next, description will be given of procedures for the process of performing double-side overwrite printing, which involve reading the first side of the original G, performing overwrite printing on the first side of the original G, reading the second side of the original G, and then performing overwrite printing on the second side of the original G. In this case, the one-side overwrite printing operation described with reference to FIG. 5A is repeated twice with respect to the original G. This can be achieved by performing overwrite printing on one side (the first side) of the original G, and subsequently reversing the original G using the double-side flapper 61, reading the second side by the original scanning unit 100, and then performing overwrite printing on the second side as in the case of FIG. 1B. In so doing, since overwrite printing is done after the original is read, misalignment of the original is seldom caused by the reversal operation.

Upon receiving an overwrite print command from the host computer, the CPU 801 drives the double-side flapper solenoid 820 and double-side drive motor 840 to operate the original feed solenoid 823. Consequently, the torque of the double-side drive motor 840 is transmitted to the original pick-up roller 91 to convey the original G to the original scanning unit 100.

Via the ASIC 802, the CPU 801 saves the original image data read by the original scanning unit 100 in the image memory 804 connected to the ASIC 802. In so doing, in the case of one-side overwrite printing, the original G stops by being nipped by the conveyance roller 42. On the other hand, in the case of double-side overwrite printing the original G stops by being nipped by the conveyance roller 43.

Subsequently, the CPU 801 transmits the original image data saved in the image memory 804 to the host computer via the external IF 850. The host computer creates overwriting image data based on the received original image data. The host computer notifies the CPU 801 about completion of overwriting image data creation and transmits the created overwriting image data. Upon being notified about the completion of overwriting image data creation from the host computer, the CPU 801 conveys the original G to the image forming unit by driving the main motor 830 and double-side drive motor 840 and performs overwrite printing on the first side using the original G as recording material. In the case of double-side overwrite printing, overwrite printing is further performed on the second side of the original G.

The overwrite printing process described above enables reading an image printed on an original, creating an overwriting image based on the reading image, and performing overwrite printing on the original. Since a common path is used both as original conveyance path and recording material conveyance path, the process of switching from original to recording material can be performed easily and automatically in the image forming apparatus without human intervention.

(3) Information Protection Printing

Next, information protection printing by means of overwrite printing will be described, where the information protection printing is intended to protect information carried by the original. When the user specifies information protection printing via the input device 851, the CPU 801 changes the operation mode to information protection print mode and notifies the information protection print control unit 805 of the information protection print mode. Upon transiting into the information protection print mode, the CPU 801 receives control instructions from the information protection print control unit 805 and performs information protection printing. The information protection print control unit 805 can perform control in the image forming apparatus 1 via the CPU 801.

FIG. 6 is a functional block diagram illustrating a configuration of the information protection print control unit 805. Incidentally, in FIG. 6, the external IF 850 is omitted. In FIG. 6, the information protection print control unit 805 includes an information protection area setting unit 8052, an image feature value analysis unit 8053, overwriting image generating unit 8054, security information generating unit 8051, and protection data transmission unit 8055. The information protection area setting unit 8052 determines an area to be subjected to overwrite printing, based on area specification by the user. The image feature value analysis unit 8053 analyzes a feature value of image shape in the area to be subjected to overwrite printing. The overwriting image generating unit 8054 generates an overwriting image based on analysis results produced by the image feature value analysis unit 8053. The security information generating unit 8051 generates security information to protect original data. The protection data transmission unit 8055 transmits the security information and the like generated by the security information generating unit 8051 to the storage device and the like.

Figure 7:
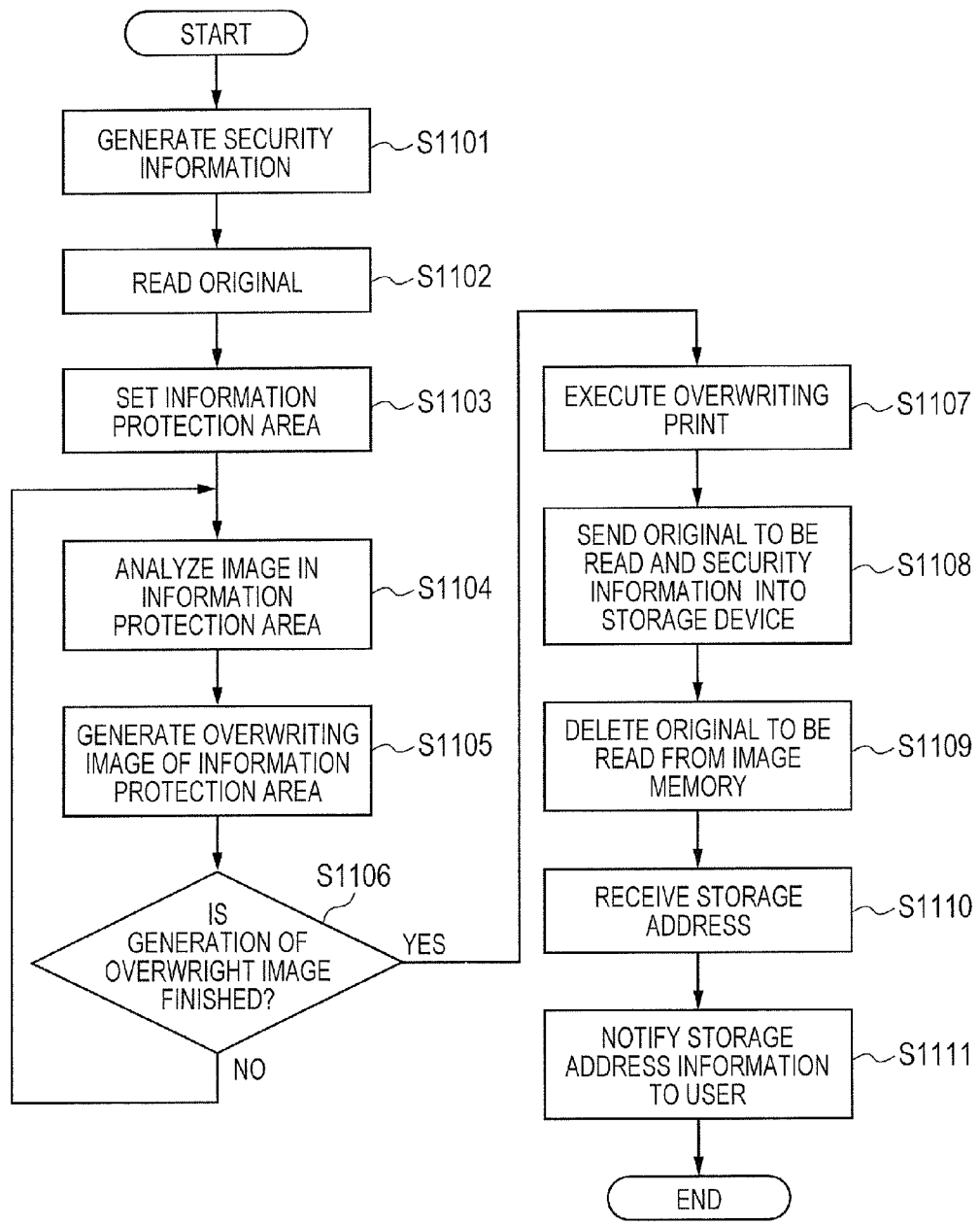
FIG. 7 is a flowchart illustrating a control sequence in an information protection print mode according to the first and third embodiments.

FIG. 7 is a flowchart illustrating a control sequence executed by the information protection print control unit 805 to perform information protection printing in information protection print mode. When the information protection print control unit 805 is notified of a change to the information protection print mode by the CPU 801, the processes in FIG. 7 are performed.

In Step 1101 (hereinafter expressed in the form "S1101"), using a user's desired password acquired through the input device 851, the security information generating unit 8051 generates security information to protect read original; data. Detailed description of security information generation will be provided in a third embodiment.

Next, in S1102, on instructions from the information protection print control unit 805, the CPU 801 conveys the original G contained in the second sheet feeding unit 90 to the original scanning unit 100 and reads the image on the original. The original image read by the original scanning unit 100 is saved as read original; data temporarily in the image memory 804.

In S1103, the information protection area setting unit 8052 instructs the CPU 801 to display the read original; data, saved in the image memory 804, on a display device 852. Then, by watching the read original; data displayed on the display device 852, the user selects an area subject to information protection (area to be subjected to overwrite printing) in the read original; data and enters the selected area via the input device 851. As the area subject to information protection is entered, the information protection area setting unit 8052 can set the area to be subjected to overwrite printing. Incidentally, the user can specify plural overwrite print areas.

In S1104, the image feature value analysis unit 8053 analyzes a feature value of an image in an overwrite print area of the read original; data, where the overwrite print area is an information protection area set by the information protection area setting unit 8052. That is, the image feature value analysis unit 8053 reads the original image data from the image memory 804 and analyzes the feature value of the original image data contained in the information protection area set by the information protection area setting unit 8052. In S1105, based on the analysis results produced by the image feature value analysis unit 8053, the overwriting image generating unit 8054 generates an overwriting image to protect inscribed information of the original.

Now, processes of the image feature value analysis unit 8053 and overwriting image generating unit 8054 will be described in detail with reference to FIGS. 8A to 8E. According to the present embodiment, the image feature value analysis unit 8053 performs analysis using size (font size) of inscribed information such as characters and numerals in read original; image data as a feature value. Then, according to the size (feature value) of inscribed information in the read original; data, the overwriting image generating unit 8054 generates an overwriting image made up of alphanumeric characters and symbols generated randomly.

Figures 8A, 8B, 8C, 8D, 8E:
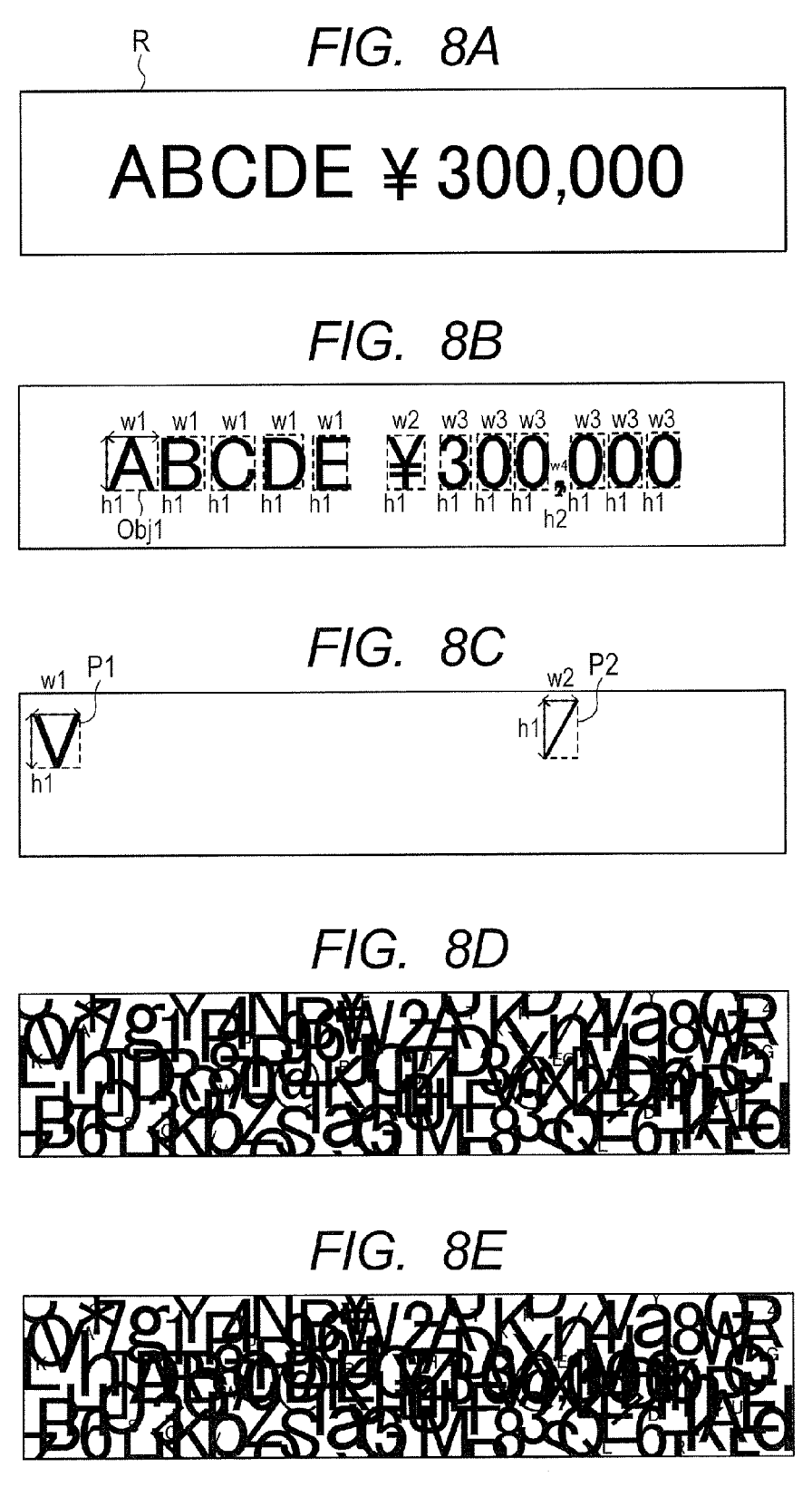

The image feature value analysis unit 8053 reads that part of the read original; data which corresponds to the information protection area subject to information protection out of the image memory 804, the information protection area having been set by the information protection area setting unit 8052. FIG. 8A is a diagram illustrating an example of read original; data which has been set as an information protection area by the information protection area setting unit 8052 based on user input, where R denotes the information protection area specified by the user, i.e., set by the information protection area setting unit 8052. Information protection image data used to protect inscribed information in the information protection area is generated by the overwriting image generating unit 8054.

Next, the image feature value analysis unit 8053 divides the information (alphanumeric characters and symbols in FIG. 8A) contained in the information protection area into individual items of information using a known labeling technique. Then, vertical and lateral lengths per a unit of information are calculated as a size of the unit of information. FIG. 8B is a diagram in which the inscribed information shown in FIG. 8A is divided into individual items of information and each unit of information is surrounded by broken lines. In FIG. 8B, w1, w2, w3 and w4 represent widths of the units of information which are inscribed characters (alphanumeric symbols) while h1 and h2 represent heights of the units of information which are the inscribed characters (alphanumeric symbols). Then, the image feature value analysis unit 8053 calculates the size of the image of a unit of information whose lateral width is w1 and vertical height is h1 as the feature value.

The overwriting image generating unit 8054 generates an overwriting image based on the sizes of the images of the units of information, which are analysis results produced by the image feature value analysis unit 8053. The overwriting image generating unit 8054 has a list of alphanumeric symbols according to aspect ratios to generate alphanumeric symbols according to the aspect ratios of image feature values and generates alphanumeric symbols as images at random positions in the information protection area. The process of generating an overwriting image will be described with reference to FIG. 8C. For example, if there are plural candidates A, B, ..., V, ... for an alphanumeric symbol with an aspect ratio of h1:w1, a symbol is selected randomly from among the candidates ("V" in this case). The selected symbol is generated with an aspect ratio of h1:w1 at a random position (position P1 in this case). Furthermore, from among the alphanumeric candidates with an aspect ratio of h1:w2, a symbol is selected randomly ("/" in this case) and a generating position is determined randomly (position P2 in this case). This process is performed for the image feature values of all the units of information, and when all the image feature values are processed, the image generation described above is repeated until a prescribed process termination condition is met. According to the present embodiment, the process termination condition is that a print coverage rate which represents the area of the overwriting image contained in a range of each unit of information exceeds a predetermined value of 50%, where the print coverage rate is calculated by the image feature value analysis unit 8053. The print coverage rate here is a ratio of the printed area containing randomly selected alphanumeric characters and symbols to the overwriting image area. For example, it is assumed that the area of Obj1, which is a unit of information, is h1 high×w1 wide. When the unit of information subjected to overwrite printing is only Obj1, the termination condition for image generation is that an overwriting image whose area is equal to or larger than (h1×w1×0.5) is produced in the range of Obj1. An overwriting image generated by the overwriting image generating unit 8054 under this condition is shown in FIG. 8D. FIG. 8D is an overwriting image produced by randomly arranging alphanumeric symbols of various sizes based on sizes of inscribed information in FIG. 8B.

In S1106, the information protection print control unit 805 determines whether or not an overwriting image has been generated for all the information protection areas specified by the user. If not, the information protection print control unit 805 returns to S1104. If yes, the information protection print control unit 805 goes to S1107.

In S1107, to perform overwrite printing on the original, the information protection print control unit 805 gives printing instructions to the CPU 801 and transmits the overwriting image generated by the overwriting image generating unit 8054 to the CPU 801. Then, the CPU 801 conveys the original to the image forming unit and prints the overwriting image received from the information protection print control unit 805 by overwriting the original. FIG. 8E is a diagram in which the overwriting image for information protection shown in FIG. 8D is printed over the information protection area of the original shown in FIG. 8A by overwriting the latter. Since an overwriting image is generated based on read original; data in this way, the inscribed information of the original can be made difficult to read by consuming a reduced amount of toner.

In S1108, the CPU 801 transmits the read original; data saved in the image memory 804 as well as the security information generated by the security information generating unit 8051 and received from the information protection print control unit 805 to the storage device 853 to save the read original; data and security information. In S1109, the CPU 801 deletes the read original; data from the image memory 804 for the reason of information protection. In S1110, the CPU 801 acquires storage device address information from the storage device 853 in which the read original; data and security information have been saved. In S1111, the CPU 801 notifies the user by displaying the address information on the two pieces of information saved in the storage device on the display device 852. S1108 to S1111 will be described in detail in the third embodiment.

As described above, the present embodiment can reduce toner consumption and protect information reliably by overwrite printing. In particular, in information protection printing by means of overwrite printing, the overwriting image can be changed according to the read image and the inscribed information of the original can be made difficult to read by consuming an appropriate amount of toner. Besides, since a common path is used both as original conveyance path and recording material conveyance path, overwrite printing can be performed precisely at a desired position on the read original.

Also, although in the present embodiment, a control unit configured to control information protection printing is provided independently of the control unit of the image forming apparatus, the present invention is not limited to this configuration. For example, a control unit configured to control information protection printing may be provided on the host computer or information protection printing may be controlled by dividing functions between the CPU 801 and ASIC 802.

In the present embodiment, as a method for specifying an area subject to information protection, description has been given of a method which displays an image stored in the image memory 804 on the display device 852, allowing the user to select an area via the input device 851. However, any appropriate method may be used as long as the method allows the user to specify an area of an original subject to information protection at will, including, for example, a method which involves searching a read image of an original for any pre-registered character string by a known character recognition process and designating any area containing such a character string, if detected, as an area subject to information protection.

Furthermore, if the position of the area subject to information protection on the original is specified relative to the original's edges of the original (the leading edge of the original in the conveyance direction as well as the left and right edges of the original), high-accuracy registration is enabled even in double-side overwrite printing. This is because the misalignment of the original caused during double-side overwrite printing as described with reference to FIG. 5B can be corrected with reference to the original's edges after reversal operation. If the same information protection printing is done at the same position on the second side during double-side overwrite printing, since no time is required for image feature analysis and overwriting image generation on the second side, the time required for image generation on the second side can be reduced.

Although with image feature value analysis method according to the present embodiment, the vertical and lateral lengths of each unit of information are used as feature values, the method for calculating the feature values is not limited to this. For example, the area ratio of a unit of information or read color information may be used as a feature value. Furthermore, when color information is used as a feature value, the color of an image pattern used for overwriting may be changed.

Also, although in the present embodiment, the images generated by the overwriting image generating unit 8054 are alphanumeric characters and symbols, the images generated are not limited to this. Regarding generated images, hiragana, katakana, or kanji or characters of languages other than Japanese and English may be used for image data of generated overwriting images. Furthermore, after the overwrite printing described above, the CPU 801 may detect and check a state of overwriting by causing the original scanning unit 100 to read again the original subjected to overwrite printing. As a result of detecting the state of overwriting, if there are any defective conditions in the state of overwriting thus detected, the CPU 801 may perform overwrite printing again.

(Second Embodiment)

In the first embodiment, description has been given of a method for generating an information protection image at the direction of the user based on inscribed information which is printed on a read original; and is subject to information protection. In the present embodiment, description will be given of a method which involves printing an image pattern on a read original; in advance to specify information protection printing, reading the image pattern using the original scanning unit 100, and generating an overwriting image based on the results of reading.

Figure 9A:
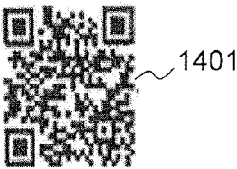

As an image pattern specifying information protection printing, for example, a QR code (registered trade name) which is a two-dimensional code may be used. An example of the present embodiment is shown in FIGS. 9A and 9B. FIG. 9A is an original before overwrite printing and FIG. 9B is the original in FIG. 9A after information protection printing. On the original in FIG. 9A, which is a written estimate, the address and telephone number of the company which has issued the written estimate are written at a location corresponding to a location 1402 in FIG. 9B. Similarly, on the written estimate in FIG. 9A, quantities, unit prices, and estimated prices of products are written at a location corresponding to a location 1403 in FIG. 9B. When information protection printing is applied to important inscribed information depicted in the original, the inscribed information in the original can be made difficult to read.

The example described in the present embodiment involves reading QR code (registered trade name) 1401 on an original and thereby performing overwrite printing operation in predetermined locations (locations 1402 and 1403 in FIG. 9B). The present embodiment is applicable, for example, when the original subject to information protection has a standard format and the inscribed information subject to information protection is printed at a fixed location (place). In such a case, even if the user does not specify an information protection area, information protection printing can be applied automatically to an original and the information protection printing can be done on a document made up of plural sheets of the same format in a short time. Furthermore, since the original's edges are detected at the same time when the original scanning unit reads the original, if the same information protection printing is permitted for the second and subsequent sheets by the user, the time required to generate an overwriting image can be reduced and the information protection printing can be done in a shorter time.

As described above, the present embodiment can reduce toner consumption and protect information reliably by overwrite printing. In particular, when the original has a standard format, even if the user does not specify an information protection area, information protection printing can be done automatically, reducing toner consumption and improving productivity of the image forming apparatus.

(Third Embodiment)

In the case of information protection by means of overwrite printing, the read original; data produced by reading the original needs to be deleted promptly for security reasons. Therefore, after the read original; data is deleted, when the read original; data becomes necessary again, conventionally there is no way to restore the data. In the present embodiment, description will be given of a method which can save or restore read data safely by saving the read original; data used for information protection printing together with security information.

In the present embodiment, by referring to FIGS. 6, 7 and 10, detailed description will be given of restoration printing of the read original; data as well as a method for saving read original; data together with user's desired security information in the information protection print mode.

(Generating and Saving Security Information)

In FIG. 7, as described in the first embodiment, when the CPU 801 enters the information protection print mode, the security information generating unit 8051 of the information protection print control unit 805 generates security information for protection of the original data in S1101. The security information may be a user's desired password acquired through the input device 851 as described in the first embodiment or may be ID information read through the card reader 854 when the user logs in to the image forming apparatus 1. Any method may be used as long as the user is allowed to limit a range of information protection.

Next, in S1102 to S1107 of FIG. 7, information protection printing is done by performing overwrite printing on the original. Since the operations of overwriting image generation and information protection printing have been described in the first embodiment, description thereof will be omitted. When the information protection printing is finished, the protection data transmission unit 8055 acquires the read original; data read from the image memory 804 via the CPU 801 and ASIC 802 in S1108. Furthermore, the protection data transmission unit 8055 acquires the security information from the security information generating unit 8051 and transmits a set of the read original; data and security information to the storage device 853 via the CPU 801. The storage device 853 may be installed in the image forming apparatus 1 or installed as an external storage device connected to a network such as a LAN (local area network) connected with the image forming apparatus 1. In S1109, after the security information and read original; data are transmitted to the storage device 853, the information protection print control unit 805 instructs the CPU 801 to delete the read original; image data from the image memory 804. Also, upon receiving the security information and read original; data, a control unit (not shown) of the storage device 853 stores the received data in the storage device 853 and transmits address information indicating a saving location of the received data to the information protection print control unit 805. In S1110, the information protection print control unit 805 receives storage address information from the storage device via the CPU 801. In S1111, on instructions from the information protection print control unit 805, the CPU 801 provides the security information and saving-location address information to the user via the display device 852, and thereby terminates the information protection print mode, where the saving-location address information indicates the location in the storage device 853 at which the security information and read original; data are saved.

(Restoration Printing of Saved Data)

Next, restoration printing operation for saved data will be described with reference to a flowchart of FIG. 10. FIG. 10 is a flowchart illustrating a control sequence executed by the CPU 801 to perform information restoration printing. When the user specifies restoration printing via the input device 851, the CPU 801 changes the operation mode to a restoration print mode and performs restoration printing.

Figure 10:
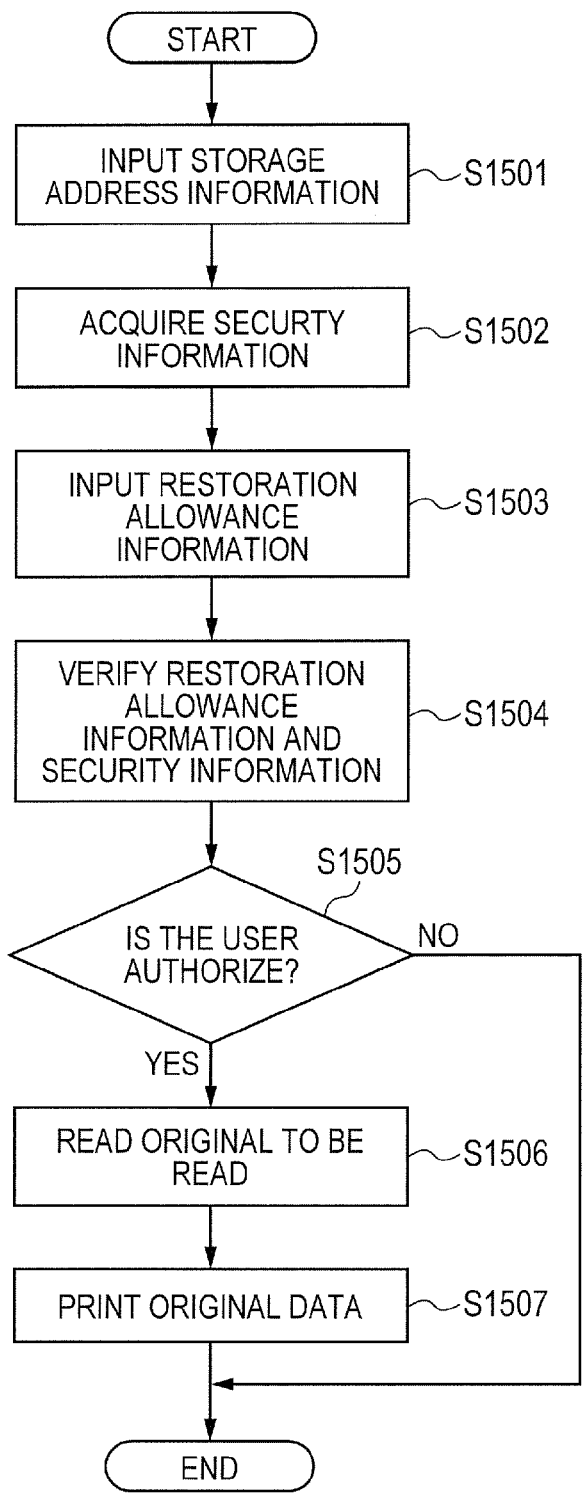
FIG. 10 is a flowchart illustrating a control sequence in a restoration print mode according to the third embodiment.

In FIG. 10, upon changing to the restoration print mode, the user enters storage address information via the input device 851 in S1501, the storage address information indicating a location in the storage device at which the original data to which the user wants to apply restoration printing has been saved. The CPU 801 acquires the storage address information via the input device 851. Next, in S1502, upon acquiring the storage address information, the CPU 801 accesses the storage device 853 and reads security information from the saved data at the appropriate address in the storage device 853 based on the entered storage address information. In S1503, the CPU 801 prompts the user to enter restoration allowance information, and the user enters restoration allowance information via the input device 851 or card reader 854. In S1504, the CPU 801 checks the restoration allowance information entered by the user against the security information read out of the storage device 853. In S1505, based on the result of checking the restoration allowance information against the security information, the CPU 801 goes to S1506 if the restoration print request is from an authorized user, but terminates the processing for restoration printing if it is determined that the user is not an authorized user. The CPU 801 reads read original; data from the address in the storage device 853 in S1506, and performs restoration printing of the retrieved original data in S1507.

Whereas in the present embodiment, a method of displaying the storage address directly on the display device 852 has been described as a method for providing storage address information, other available methods include, for example, a method of converting the storage address information into QR code (registered trade name) and displaying the QR code in a blank area of the original during information protection printing.

For overwrite printing of storage address information during information protection printing, it is necessary to acquire the saving-location address information on read original; data prior to printing. For that, the CPU 801 acquires address information for use to save the read original; data and security data from the storage device 853 in advance. Then, the CPU 801 converts the acquired storage address information into QR code (registered trade name), prints the QR code (registered trade name) during information protection printing, and then transmits security information and the read original; data saved in the image memory 804 to the storage device 853 as a set of data. Then the storage device 853 saves the received data at the storage address made known in advance. Referring to the flowchart FIG. 7, the storage address is received in S1110 before overwrite printing is done in S1107. An image obtained by converting the storage address into QR code (registered trade name) is used for overwrite printing to notify the user of the storage address. Consequently, the storage address information on the original data can be provided to the user as with the above-described method of displaying the storage address information on the display device after completion of information protection printing. Also, the saving-location address information is not limited to the QR code (registered trade name), and a code of any form may be used, include a URL which points to a location of an information resource existing on the Internet, as long as the code can identify the saving location.

Also, from the viewpoint of security, the number of restoration printing operations can be limited. In that case, the number of restoration printing operations can be limited if the user registers a permitted number of restoration printing operations during reading of the original. Then, if the original data saved in the storage device 853 is erased when the number of restoration printing operations reaches a prescribed value, a higher level of security can be ensured.

As described above, the present embodiment can reduce toner consumption and protect information reliably by overwrite printing. In particular, since read original; data and security information are saved as a set of data, security can be ensured in performing restoration.

Although description has been given in the above embodiments, keeping in mind a configuration of an image forming apparatus configured to form monochrome images, the present invention is also applicable to color image forming apparatus. Specifically, the present invention is applicable to a color image forming apparatus of a type in which photosensitive drums serving as image bearing members configured to form yellow, magenta, cyan, and black colors, respectively, are arranged side by side and images are transferred from the photosensitive drums to a recording material or an intermediate transfer member. Also, the present invention is applicable to a color image forming apparatus of a type in which images of various colors are formed in sequence on a single image bearing member (photosensitive drum), and then a color image is formed on an intermediate transfer member and transferred therefrom to a recording material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-106111, filed May 7, 2012, which is hereby incorporated by reference herein in its entirety.

What is claimed is:

1. An image forming apparatus comprising:
   a scanning unit configured to read the recording material conveyed in the image forming apparatus;
   a specifying unit configured to specify an area in which an image is formed, in a recording material read by the scanning unit; and
   an analysis unit configured to analyze a feature value of information about an image formed on the recording material read by the scanning unit,
   wherein the analysis unit further divides information contained in the specified area into individual items of information, calculates vertical and lateral lengths per a unit of information as a size of the unit of information;
   overwriting image generating unit configured to generate an overwriting image based on the size of the unit of information for individual items of information analyzed by the analysis unit;
   an image forming unit configured to overwrite the overwriting image on the image formed on the recording material in the area specified by the specifying unit,
   wherein the overwriting image is formed as an area having a predetermined ratio to the area specified by the specifying unit, and
   wherein the overwriting image is formed by one or more images chosen among plural images, the one or more images being chosen so that the predetermined ratio is more than 50 percent.

2. The image forming apparatus according to claim 1, wherein the analysis unit analyzes the feature value based on a shape of the image formed on the recording material.

3. The image forming apparatus according to claim 2, wherein the feature value is a size of the image formed on the recording material.

4. The image forming apparatus according to claim 1, wherein the overwriting image includes a character, a numeral or a symbol.

5. The image forming apparatus according to claim 1, further comprising:
   a security information generating unit configured to generate security information for the recording material; and
   a storage unit configured to store data, wherein
   the storage unit stores the security information and data representing the recording material.

6. The image forming apparatus according to claim 5, wherein the security information generating unit generates security information based on entered information.

7. The image forming apparatus according to claim 6, wherein the overwriting image contains the security information as well as address information on the data representing the recording material stored in the storage unit.

8. The image forming apparatus according to claim 7, further comprising a display unit configured to display information,
   wherein the display unit displays the address information.

9. The image forming apparatus according to claim 5, wherein the data representing the recording material stored in the storage unit is printed depending on a result of checking restoration allowance information requesting permission for restoration printing of the recording material against the security information.

10. The image forming apparatus according to claim 1, further comprising: a first conveyance path used by the image forming unit for image formation; a second conveyance path used by the scanning unit to read a first side of the recording material; and a third conveyance path used by the scanning unit to read a second side of the recording material, wherein after an image is read from the recording material by the scanning unit, the recording material is conveyed to the first conveyance path to overwrite the recording material.

11. The image forming apparatus according to claim 10, wherein an upstream portion of the second conveyance path is connected to a downstream side of the first conveyance path and a downstream portion of the second conveyance path is connected to an upstream side of the first conveyance path; and
   the third conveyance path is connected to the downstream portion of the second conveyance path.

12. The image forming apparatus according to claim 1, wherein after overwrite printing, the recording material subjected to the overwrite printing is read again by the scanning unit to detect a state of overwriting.

13. The image forming apparatus according to claim 12, wherein overwriting is executed again based on a result of detecting the state of overwriting.

14. The image forming apparatus according to claim 1, wherein after the scanning unit reads image data in the recording material, the recording material is automatically conveyed to the image forming unit to overwrite the overwriting image on the recording material.

15. The image forming apparatus according to claim 1, wherein the overwriting image is overwritten at the predetermined ratio, whereby the image formed on the original is unreadable.

16. The image forming apparatus according to claim 1, wherein the overwriting image is chosen among the plural images randomly.

17. The image forming apparatus according to claim 1, further comprising a storage unit for storing the plural images used for forming the overwriting image.

18. The image forming apparatus according to claim 1, further comprising: a conveyance path for conveying the recording material to the image forming unit without passing through the scanning unit, and discharging the recording material on which an image is formed by the image forming unit to a position external to the image forming apparatus; and a conveyance path for conveying the recording material scanned by the scanning unit to the image forming unit.

19. The image forming apparatus according to claim 1, further comprising: a conveyance path for conveying the recording material to the image forming unit without passing through the scanning unit; a conveyance path for conveying the recording material on which an image is formed by the image forming unit to the scanning unit; a conveyance path for conveying the recording material to the scanning unit without passing through the image forming unit, and discharging the recording material scanned by the scanning unit to a position external to the image forming apparatus; and a conveyance path for conveying the recording material scanned by the scanning unit to the image forming unit.

* * * * *